United States Patent [19]

Magill

[11] 4,304,248

[45] Dec. 8, 1981

[54] DAMPER BLADE OPERATING MECHANISM

[75] Inventor: Robert J. Magill, Whitstable, England

[73] Assignee: Actionaire Equipment Limited, Whitstable, England

[21] Appl. No.: 102,988

[22] Filed: Dec. 11, 1979

[30] Foreign Application Priority Data

Jan. 26, 1979 [GB] United Kingdom ............... 02901/79

[51] Int. Cl.³ ............................................. F16K 13/04

[52] U.S. Cl. ...................................... 137/75; 137/601; 49/7; 49/84

[58] Field of Search ....................... 137/601, 75; 160/1; 49/7, 84; 98/110, 121 A

[56] References Cited

U.S. PATENT DOCUMENTS 4,184,288 1/1980 Magill et al. .................... 137/601 X

FOREIGN PATENT DOCUMENTS 1302252 1/1973 United Kingdom .................. 137/75

*Primary Examiner*—Harold W. Weakley

*Attorney, Agent, or Firm*—Berman, Aisenberg & Platt

[57] ABSTRACT

An assembly comprising a fluid damper with movable blades which is contained in a duct. On the outside of the duct there is a blade release mechanism. A fusible actuating cartridge is arranged to act on the blade release mechanism to release the blades from their normal postions if and when fire breaks out. The cartridge projects through an opening in the duct so as to be readily removable from the duct.

9 Claims, 17 Drawing Figures

Figure 1:
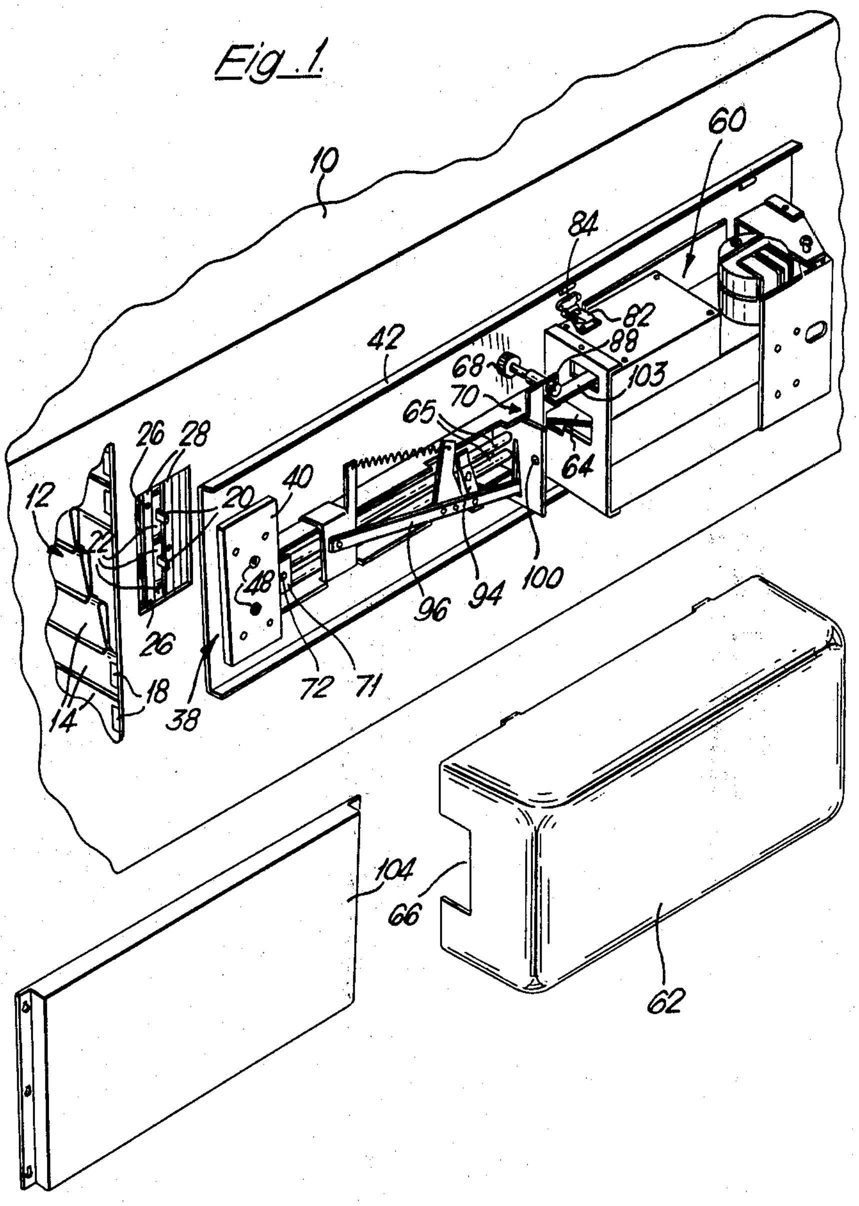

Fig. 2.
Fig. 1b.
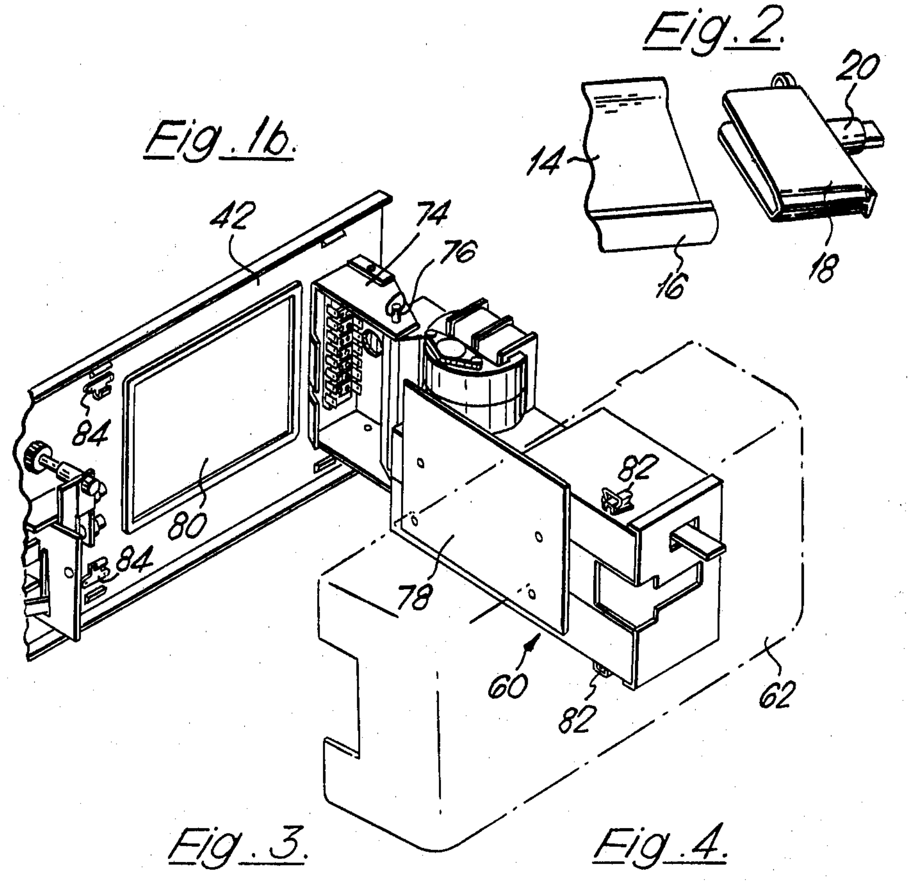
Fig. 3.
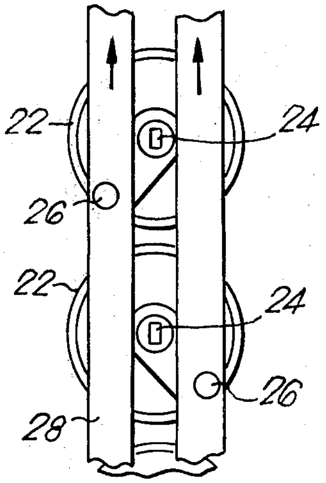
Fig. 4.
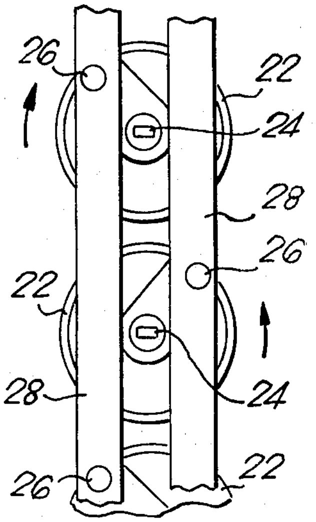

DAMPER BLADE OPERATING MECHANISM

This invention relates to devices and mechanisms for operating the movable blades of fluid dampers.

In U.S. patent application Ser. No. 916,357 filed on June 16, 1978 in the name of Robert J. Magill et al, and in U.S. patent application Ser. No. 877,185 in the name of Robert J. Magill et al there are described fluid dampers comprising a line of blades which are supported in a surrounding frame for rotary motion about substantially parallel axes between positions in which they fully open and fully close a fluid opening in the frame. Depending on whether the dampers are to be used as control dampers, shut-off dampers, smoke dampers, fire shield dampers or combination smoke and fire shield dampers, there is some variation in their design, but they all have some kind of mechanism whereby the blades may be rotated about their respective axes.

A particular form of mechanism which is highly suitable for operating the blades of fluid dampers is described in U.S. patent application Ser. No. 073,366 filed on Sept. 7, 1979 in the name of Robert J. Magill et al. That Application describes and illustrates a spring-motor dual-functioning mechanism adapted to operate devices such as fire and/or smoke dampers, doors, hatches, vents, traps and other devices having components which are movable between at least two positions. The drawings filed with the said last-mentioned Application show an assembly wherein the mechanism is mountd on the outside of a duct containing or incorporating a fire and/or smoke damper having a line of parallel spring-loaded blades which are rotatable about respective axes to open or close a rectangular passage formed by a frame in which the blades are supported, the blades being releasable from a "rest" position, if and when fire breaks out, by a fusible actuating cartridge carried by the damper. A linkage between rotary elements associated with the blades and the operating mechanism on the outside of the duct permits the blades to be automatically and remotely reset in their open or closed positions, the fusible actuating cartridge being over-ridden to release the damper blades. The operating mechanism is so constructed that its spring can be wound electrically, pneumatically or manually to reset and to release the blades of the damper.

The present invention is especially, but not exclusively, concerned with a development of the assembly described above. In particular, it is concerned with improvements in the way in which at least some of the components of the assembly are mounted.

From one aspect, the invention is directed to an assembly comprising a fluid damper with movable blades which is contained in, or incorporated in, at least one duct on the outside of which there is a blade release mechanism, wherein a fusible actuating cartridge, which is arranged to act on the blade release mechanism to release the blades from their normal positions if and when fire breaks out, projects through an opening in the duct so as to be readily removable from the duct.

The mounting of the cartridge on the duct instead of on the damper as previously proposed means that it can be inspected or replaced without the need to gain access to the interior of the duct. Hitherto it has been necessary to open an access opening or hatch in the duct in order to get to the cartridge, but this inconvenience is obviated by the above aspect of the present invention. It will be appreciated that the mounting of the cartridge on the duct is not dependent on the particular character of the mechanism for operating the blades. Thus, while it will be normal in many cases to have a blade-operating mechanism which incorporates a motor or some other source of power, it is by no means essential for the said mechanism to include such a motor. Thus, in certain installations where the opening and closing of the damper blades needs to be effected manually at all times, the mechanism can comprise a simple lever, a rotatable knob, or some other member which is operated by hand.

The assembly may have de-coupling or override means for allowing actuation of the blade release mechanism independently of the fusible actuating cartridge. For example the de-coupling or override means may be a de-coupling device which is mounted on the outer surface of the duct in such a position that a linkage as mentioned above between the blade-operating mechanism and the rotary elements associated with the blades passes through it or by it, the device having a releasable connection between the cartridge and the said linkage whereby testing of the blades can be carried out with the cartridge isolated.

Just as the fusible cartridge is made easily removable by means of one aspect of the present invention, so, from another aspect, the invention also provides for easy access to, and ready removal of, a blade-operating mechanism as a whole—or at least its main components. To this end, in an assembly comprising a fluid damper with movable blades which is contained in, or incorporated in, at least one duct on the outside of which there is a blade operating mechanism for moving the blades, the blade operating mechanism, or at least a main part thereof, is mounted for swinging movement away from the outside of the duct, thereby to allow easier access to parts of the mechanism. This may be done by mounting the main components of the mechanism, as a unit, for swinging movement on a bracket attached to the outer surface of the duct. Normally the said unit will lie flat against the outer surface of the duct and will be concealed from view by a removable housing. When, however, it is desired to inspect the mechanism or to replace it, the housing is removed and the unit is swung on its bracket, away from the duct, so that its various parts may be seen. If it is desired to remove the unit, then a pin which serves as a hinge axis for the unit on the bracket is simply pushed downwards or withdrawn upwards. This releases the unit from the bracket.

A further advantage arising from the use of a hinged unit as described above is that the unit—or a part of it—can serve as a hatch or door to close an access opening in the duct. Thus, an access opening can be cut in that part of the duct against which the unit lies during use of the damper, and a hatch or door provided on the unit so as to close the access opening. To ensure that the hatch or door makes a tight fit in the access opening, spring catches are provided on the unit to engage projecting lugs on the outer surface of the duct.

In order that the invention may be thoroughly understood, an example of an assembly in accordance with it will now be described with reference to the accompanying drawings, in which:

FIG. 1 is a perspective view from above of part of a duct containing a fire and/or smoke damper and having a fusible cartridge and blade-operating mechanism with a cartridge decoupling or override device mounted on its outer surface, a cover for the mechanism being shown removed;

FIG. 1*b* is a similar view to part of FIG. 1 but with the damper blade operating mechanism shown in a position where it has been swung away from the surface of the duct; and FIGS. 2 to 14 are views of different details of the assembly shown in FIGS. 1 and 1*b*.

Figure 5:
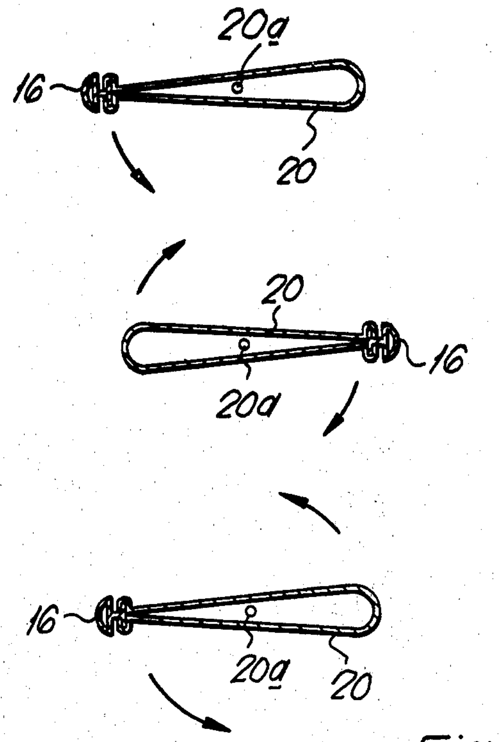
Figure 6:
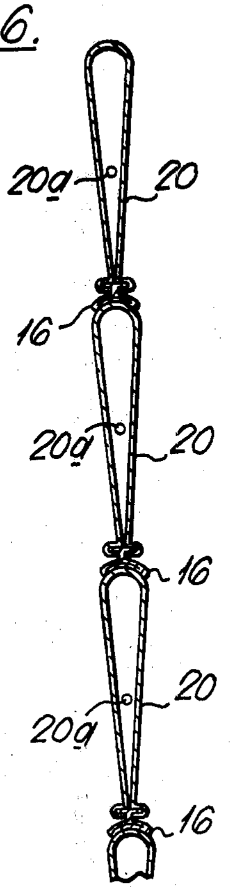

FIG. 1 shows a small portion 10 of a rectangular-section duct forming part of an air-ventilation system in, say, a building. Arranged within the duct is a combination smoke and fire shield damper 12. This comprises a line of blades 14 mounted on a rectangular frame (not shown) for rotary movement about respective parallel axes to open or close the opening in the frame. In their closed position, which is the position illustrated in FIG. 1, the leading edge of each blade (except the uppermost blade) engages the trailing edge of the blade immediately above it. To ensure that good seals are formed between the leading and trailing edges of the blades and that the blades inter-lock with each other when in their closed positions, the trailing edge of each blade is provided with hollow D-section rubber seals 16 as shown in FIGS. 5 and 6 where three adjacent blades are illustrated. FIG. 5 shows the blades 14 in their fully-open positions in which they lie parallel to the longitudinal axis of the duct, while FIG. 6 shows the blades in their fully-closed positions in which they lie substantially at right angles to that axis.

FIG. 2 shows how each blade 14 is supported for such rotary movement. The two ends of each blade are embraced and supported by respective blade bearing components 18, of which one is shown in FIG. 2. Each component 18 has a stub shaft 20, and this shaft is rotatably supported in the frame of the damper. The shaft 20 at each end of each blade thereby allows the blades to rotate about the respective axes 20*a* shown in FIGS. 5 and 6. It will be noted, incidentally, that the blades are of streamlined aerofoil section to reduce resistance to air-flow through the duct when the blades are in their open positions.

As indicated by the arrows in FIG. 5, alternate blades rotate in opposite senses and have their leading edges facing in opposite directions when the blades are in their fully open positions. To provide for such rotation and to ensure that the blades rotate together, the shafts 20 at one side of the damper frame enter central holes in respective drive discs 22, one for each blade, as shown in FIGS. 1, 3 and 4. Each shaft 20 has a rectangular-section end which enters a rectangular-section central hole 24 in its respective drive disc 22, and alternate discs are pivotally attached by pivots 26 to one of a pair of parallel drive bars or rods 28. These drive bars or rods are movable longitudinally along parallel paths. As the pivots 26 are off-centre with respect to the discs 22, it follows that longitudinal movement of the drive bars or rods 28 will result in the discs being rotated over an arc sufficient to open and close the blades 14.

The drive discs 22 are acted on by a spring arrangement to urge the blades into either their fully-closed or fully-open positions, depending on the requirements of the customer. This is effected in this particular instance by the spring arrangement shown in FIG. 7. Two of the drive discs 22 (the two shown in FIG. 1 with shafts 20 projecting from them) are rotatably fast with two spring-loaded wheels 30 each of which is acted on by a coiled spring 32 connected at one end to the periphery of its respective wheel 30 by a pin 34. Each coiled spring 32 is supported on a pin 36 in a control box 38 having a removable cover 40, the box 38 being mounted on a plate 42 which is attached to the outer surface of the duct by screws, bolts, welding or some other fastening method. The two wheels 30 have stub shafts 44 projecting from each side, and these stub shafts enter circular holes 46 in the control box 38 and circular holes 48 in the control box cover 40.

Figure 7:
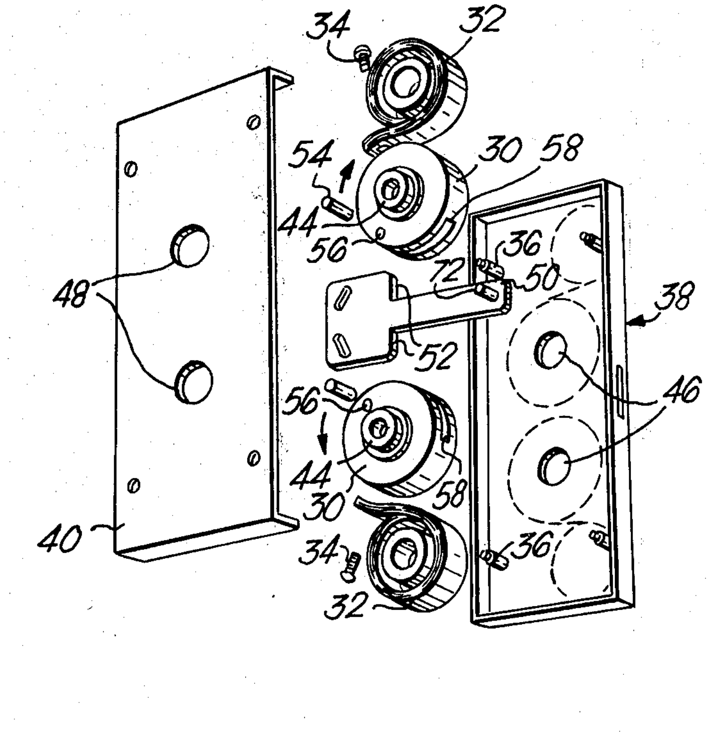

The effect of the springs 32 on the wheels 30 is to urge the latter to rotate in opposite senses or directions as shown by the arrows in FIG. 7. Because the two wheels 30 are rotationally fast with two adjacent drive discs 22, and because the drive bars or rods 28 couple all the drive discs together, all the blades 14 will be urged into either their fully-closed or their fully-open positions by the springs 32. On the assumption, however, that the spring-loaded wheels 30 are arranged in this particular instance to urge the blades 14 into their fully-closed positions, a sliding operating member 50 is also provided in the control box 38 to hold the wheels 30 in a position corresponding to the fully-open positions of the blades. The sliding member 50 has two shoulders 52 which engage two pins 54 on the wheels 30 within arcuate peripheral grooves 58 in the wheels 30, the pins 54 being located in holes 56.

The assembly illustrated in FIG. 1 comprises also a spring-motor dual-functioning mechanism 60 which is normally enclosed by a removable housing 62. The construction of the mechanism 60 will not be described in detail as it is essentially the same as that described in our U.K. patent application No. 36293/78 previously referred to. All that need be said here is that the mechanism 60 contains a spring motor which is arranged to be wound electrically or pneumatically or by hand to reset and to release the blades 14 of the damper, the resetting and releasing of the blades being effected through a rotatable lever 64 which projects from the housing 62 through a recess 66 in the latter.

In addition, the assembly shown in FIG. 1 includes a fusible actuating cartridge 68 and a cartridge de-coupling or overriding device 70 through which or by which pass longitudinally-movable link rods 65 which are connected to be moved by the rotatable lever 64. The cartridge serves to initiate closing of the blades if and when fire breaks out. As will be seen from FIG. 1, the ends of the link rods 65 adjacent the control box cover 40 are removably connected by U-plate 71 and a pin 72 to the sliding member 50 (shown in FIG. 7).

Hitherto it has been the practice to position a fusible actuating cartridge on the frame of the damper. This means that, to get to the cartridge in order to inspect it or replace it, an access hatch or door in the duct near the damper has had to be opened first. This inconvenience is avoided in the present assembly by reason of the fact that the cartridge 68 projects through a respective opening in the duct and can therefore be removed, inspected and, if necessary, replaced without any trouble. The particular cartridge shown in FIGS. 10–13 has an external screw-thread 73 which allows it to be screwed into a screw-threaded hole 75 provided in the plate 42 attached to the duct, there being a matching hole in the duct wall itself.

Figure 14:
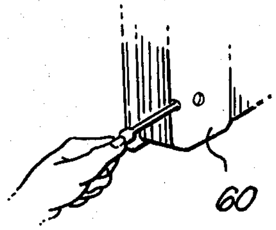

A further advantage of the assembly described above is that the mechanism 60 is mounted, as a unit, for swinging movement about a vertical axis on a bracket 74 attached to the outer surface of the duct via the plate 42. Normally, as shown in FIG. 1, the unit 60 will lie flat against the outer surface of the duct and will be concealed from view by the housing 62. When, however, it is desired to inspect the mechanism 60 or to replace it, the housing 62 is removed and the mechanism is swung on the bracket 74, away from the duct into the position illustrated in FIG. 1*b* where its various parts may be seen. If it is desired to remove the unit, it is a simple operation to withdraw a pivot pin 76 on the bracket upwards. Alternatively it would be possible to make the pin so that it can be pushed downwards for removal of the mechanism 60. As shown in FIG. 14, electrical connections to the mechanism 60 will be disconnected before the unit is removed.

A further benefit obtained by mounting the mechanism 60 so that it can be swung about the pivot pin 76 is that a plate acting as a door 78 can be incorporated in the unit to close an access opening 80 in the duct wall and plate 42. When the mechanism 60 lies against the duct wall, the hatch or door 78 will close the access opening 80, a tight fit being ensured by the provision on the mechanism of spring catches 82 which engage projecting lugs 84 on the plate 42 attached to the duct wall.

The fusible actuating cartridge 68 and the cartridge de-coupling or overriding device 70 are mounted on the plate 42 between the mechanism 60 and the control box 38. As will be seen from FIGS. 8, 9*a* and 9*b* the cartridge has an axially-projecting spindle 86 which has an external screw-thread on its outer end and onto which a screw-threaded button 88 is screwed. The spindle 86 is biassed by a spring 87 (see FIG. 1) so as to be urged axially inwards further into the duct 10. A portion of the spindle 86 adjacent to the button 88 rests in a slot 89 of a triggering arm 90 of the device 70. The slot is wide enough to allow the spindle to extend through it, but not the button 88. With the cartridge spindle 86 and the arm 90 thus engaged, the pivotal levers 94 and 96 shown in FIG. 1 are arranged horizontally to prevent longitudinal movement to the left of the link rods 65. As the link rods 65 are connected to the sliding member 50, the latter is thus held in a position where the two spring-loaded wheels 30 in the control box 38 and/or the spring motor in the mechanism 60 are prevented from closing the blades 14. In other words, the blades 14 are maintained in their fully-open positions due to the link rods 65 being held by the levers 94 and 96. If, now, the fusible part 98 of the cartridge should melt due to an outbreak of fire, the spindle 86 of the cartridge will move axially inwards from its position of FIG. 10 to the position which it has in FIG. 13, under the action of the spring 87. That movement of the spindle will cause the arm 90 of the device 70 to swing slightly about its pivot 100 towards the duct 10, with the result that the free end of the lever 96 will be pressed downwards by a shoulder portion 102 on the arm 90 and will drop down into the position which it has in FIG. 1. The levers 94 and 96 will no longer be in a position to hinder longitudinal movement to the left of the link rods 65. This releases the blades which will accordingly snap shut under the power of the spring-loaded wheels 30 and/or the spring motor of the mechanism 60 from their normal open positions as shown in FIG. 5 to their closed positions shown in FIG. 6.

It is also possible to shut the damper independently of the cartridge 68 by pushing the upper end of the arm 90 inwards either manually or by means of a lever arm 103 of the mechanism 60. This override is allowed for by a sleeve 105 which is mounted on the spindle 86 and is biassed by a spring 86 (see FIG. 11) towards the button 88. Thus the arm 90 can rotate about its pivot 100 towards the duct 10 against the spring biassing of the sleeve 105 without moving the spindle 86.

If it is desired to isolate the cartridge 68 from the rest of the assembly for testing or inspection purposes, the button 88 can be unscrewed off the spindle 86. Apart from a biassing spring 107, the arm 90 is then free to swing outwardly from the duct 10 so that it no longer bears on the lever 96.

Finally, it is to be noted that the control box 38 and most of the device 70 will normally be covered by a further removable cover 104 which is attached by screws or bolts to the plate 42.

Figure 8:
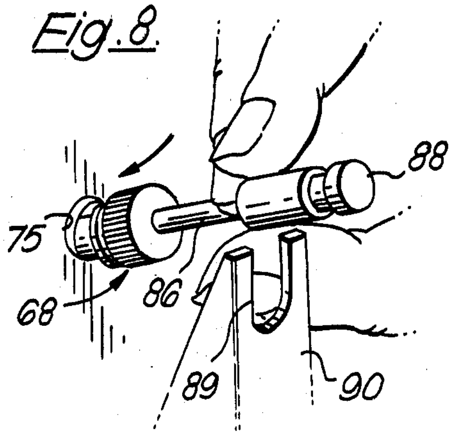
Figure 9A:
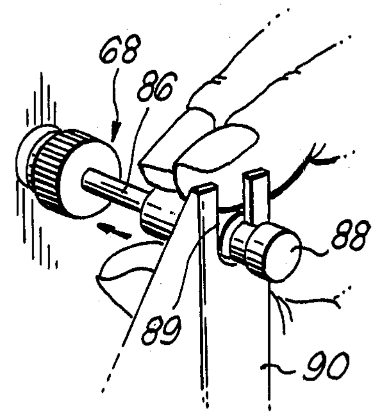
Figure 9C:
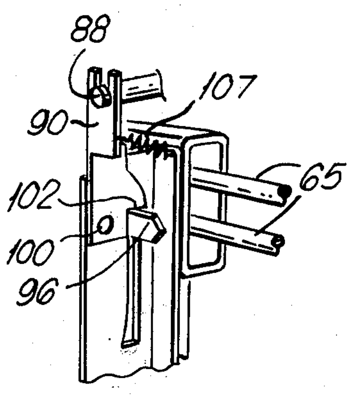
Figure 9B:
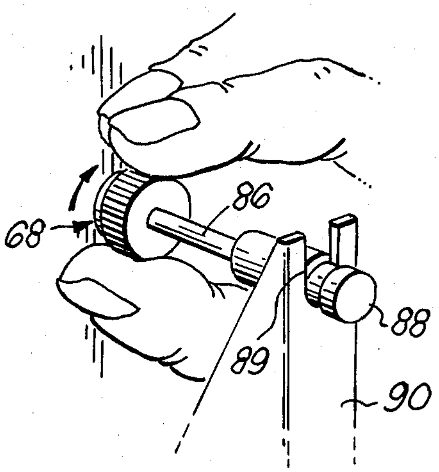
Figure 10:
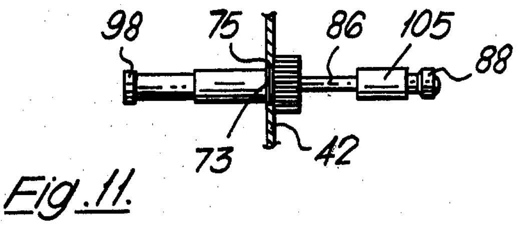
Figure 11:
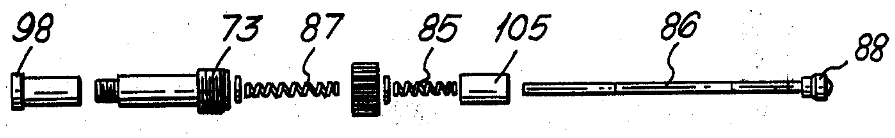
Figure 12:
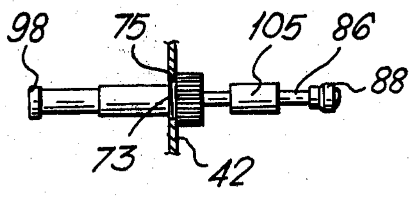
Figure 13:
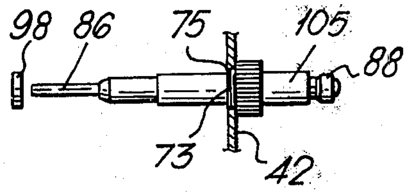

FIGS. 8, 9*a* and 9*b* show how readily a fusible cartridge can be inserted or removed. For insertion, the fusible end of the cartridge is put through the screw-threaded hole 75 in the plate 42, the spindle 86 is dropped into the slot 89 with the sleeve 105 and button 88 on opposite sides of the arm 90, and the screwthread 73 on the cartridge rotated to engage the screwthread of the hole 75. For removal, the screwthreads are disengaged and the spindle 86 is slid upwardly free from the slot 89.

For ease of installation, the mechanism 60, the device 70 and the control box 38 are all mounted on the plate 42 in the factory. The installer then cuts appropriate holes in the side walls of the duct and attaches the plate 42 to the duct. Once that has been done, the plate 42 in effect forms part of the duct.

It is to be understood that, although the particular damper shown in the drawings has its frame totally enclosed by the duct, the invention is equally applicable to installations where the frame abuts against the ends of two opposing duct portions.

I claim:

1. A fluid damper assembly comprising:

(a) a duct through which fluid flows when the duct is in use;

(b) a fluid damper extending across said duct;

(c) blades of said fluid damper movably mounted therein to affect fluid flow through said duct; and (d) a blade operating mechanism actuable to move said blades and mounted for swinging movement away from the outside of said duct, thereby to allow easier access to parts of said mechanism.

2. An assembly according to claim 1, wherein said blade operating mechanism is releasably mounted on said duct.

3. An assembly according to claim 2, further comprising hinge means including a removable pin by which said blade operating mechanism is hinged to said duct.

4. An assembly according to claim 1, further comprising portions of said duct defining an access-opening, and a portion of said blade operating mechanism arranged to serve as a closure of the access-opening whereby said access-opening is opened when said blade operating mechanism is swung away from said duct.

5. A fluid damper assembly comprising:

(a) a duct through which fluid flows when the duct is in use;

(b) a fluid damper extending across said duct;

(c) blades of said fluid damper movably mounted therein to affect flow through said duct;

(d) a blade release mechanism arranged on the outside of said duct and connected to said fluid damper so as to be capable of releasing said blades from positions which they normally occupy;

(e) wall portions of said duct defining an opening therein;

(f) a fusible actuating cartridge arranged to act on said blade release mechanism to release the blades from their normal positions if and when fire breaks out, said fusible actuating cartridge projecting through said opening in said duct so as to be readily removable from said duct;

(g) a spindle of said fusible actuating cartridge;

(h) a button on an end of said spindle;

(i) a triggering member of said blade release mechanism;

(j) an aperture-defining part of said triggering member, said spindle extending through the aperture in said triggering member; and (k) means to urge said button on said spindle against said aperture-defining part of said triggering member to actuate said blade release mechanism if and when fire breaks out, said aperture-defining part also being movable away from said button to actuate said mechanism independently of said cartridge.

6. An assembly according to claim 5, further comprising spring biassing means arranged to urge said spindle inwardly into said duct, and a fusible portion of said cartridge arranged to restrain said spindle from such inward movement unless and until a fire breaks out.

7. An assembly according to claim 5, wherein said button is removably attached to said spindle to allow testing of said blades with said cartridge isolated.

8. An assembly according to claim 5, wherein said aperture is an open-ended slot whereby the button end of said spindle can be slid away from said triggering member.

9. An assembly according to claim 5, further comprising a sleeve slidably mounted on said spindle to be movable axially therealong, and spring means acting on said sleeve to urge the latter towards said triggering member, and thereby to urge the triggering member towards said button.

* * * * *